(12) United States Patent
Sato et al.

(10) Patent No.: US 10,416,443 B2
(45) Date of Patent: *Sep. 17, 2019

(54) LIGHT AMOUNT ADJUSTING DEVICE, IMAGING OPTICAL SYSTEM, AND IMAGE CAPTURING APPARATUS

(71) Applicant: CANON DENSHI KABUSHIKI KAISHA, Chichibu-shi (JP)

(72) Inventors: Yasuhiro Sato, Chichibu (JP); Michio Yanagi, Chichibu (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,239

(22) Filed: Jun. 26, 2018

(65) Prior Publication Data

US 2018/0299663 A1    Oct. 18, 2018

Related U.S. Application Data

(63) Continuation of application No. 14/627,091, filed on Feb. 20, 2015, now Pat. No. 10,302,934, which is a (Continued)

(30) Foreign Application Priority Data

Aug. 31, 2012 (JP) ................................ 2012-192229

(51) Int. Cl.
*G02B 26/02* (2006.01)
*G03B 9/02* (2006.01)
(Continued)

(52) U.S. Cl.
CPC .............. *G02B 26/023* (2013.01); *G02B 1/11* (2013.01); *G02B 26/008* (2013.01); (Continued)

(58) Field of Classification Search
CPC .... G02B 26/02; G02B 26/023; G02B 26/026; G02B 26/04; G02B 27/0172; (Continued)

(56) References Cited

U.S. PATENT DOCUMENTS 5,267,038 A * 11/1993 Fister ..................... H04N 17/04
348/187
5,270,866 A   12/1993 Ozumi et al.
(Continued)

FOREIGN PATENT DOCUMENTS

CN    1564963 A    1/2005
CN    1696813 A    11/2005
(Continued)

OTHER PUBLICATIONS

"Multispectral High Dynamic Range Imaging", Rochester Institute of Technology, Brauers et al. 2003 (Year: 2003).*
(Continued)

*Primary Examiner* — Evan P Dzierzynski
*Assistant Examiner* — Alberto J Betancourt
(74) *Attorney, Agent, or Firm* — Venable LLP (57) ABSTRACT

There is provided with a light amount adjusting device. The light adjusting device has a plurality of optical filter elements. The plurality of optical filter elements have different light transmittances. Reflected light colors from the plurality of optical filter elements are substantially equal.

10 Claims, 7 Drawing Sheets

Related U.S. Application Data continuation of application No. PCT/JP2013/005134, filed on Aug. 30, 2013.

(51) Int. Cl.
*G03B 11/00* (2006.01)
*G02B 26/00* (2006.01)
*G02B 27/00* (2006.01)
*G02B 1/11* (2015.01)

(52) U.S. Cl.
CPC ........... *G02B 27/0018* (2013.01); *G03B 9/02* (2013.01); *G03B 11/00* (2013.01)

(58) Field of Classification Search
CPC ........ G02B 27/0176; G02B 2027/0118; G02B 5/003; G02B 5/201; G02B 2027/0116; G02B 2027/012; G02B 2027/0147; G02B 2027/015; G02B 2027/0152; G02B 2027/0159; G02B 5/285; G02B 1/08; G02B 27/0018; G02B 27/14; G02B 5/0294; G02B 5/0825; G02B 5/20; G02B 5/205; G02B 5/207; G02B 5/286; G02B 5/3025; G02B 6/0056; G02B 7/08; G02F 1/133512; G02F 1/133514; G02F 1/136209; G02F 1/133553; G02F 1/133305; G02F 1/1335; G02F 2201/08; G02F 2201/086; H01L 51/0097; H01L 27/3211; G03F 7/0007
USPC ... 359/885–892, 491.01, 588, 590, 601–614, 359/723; 356/402, 416–419; 396/275, 396/307
See application file for complete search history.

(56) References Cited

U.S. PATENT DOCUMENTS

| 6,078,442 | A  | * | 6/2000  | Tada ................. G02B 5/205 359/885 |
|-----------|----|---|---------|------------------|
| 7,230,779 | B2 |   | 6/2007  | Kunii et al.     |
| 7,932,952 | B2 |   | 4/2011  | Murata et al.    |
| 2003/0086014 | A1 | | 5/2003  | Murata et al.    |
| 2003/0189758 | A1 | | 10/2003 | Baer et al.      |
| 2004/0021967 | A1 | | 2/2004  | Yanagi et al.    |
| 2004/0027706 | A1 | | 2/2004  | Nakajima et al.  |
| 2004/0113876 | A1 | | 6/2004  | Motomura         |
| 2005/0254155 | A1 | | 11/2005 | Kunii et al.     |
| 2006/0181615 | A1 | * | 8/2006  | Mihara ................ G02B 5/04 348/222.1 |
| 2008/0297647 | A1 | * | 12/2008 | Okabe .................. G03B 17/14 348/340 |
| 2010/0259824 | A1 | * | 10/2010 | Mitsuhashi ............ G02B 5/205 359/585 |
| 2011/0128405 | A1 | | 6/2011  | Handa            |
| 2011/0211099 | A1 | | 9/2011  | Nayar et al.     |
| 2013/0039053 | A1 | * | 2/2013  | Takakura ............ H05B 33/0851 362/231 |
| 2014/0071552 | A1 | | 3/2014  | Uchiyama et al.  |
| 2014/0085729 | A1 | | 3/2014  | Uchiyama et al.  |

FOREIGN PATENT DOCUMENTS

| EP | 2 952 959 A1 | 12/2015 |
|----|--------------|---------|
| JP | 2001-222042 A | 8/2001 |
| JP | 2004-061903 A | 2/2004 |
| JP | 2004-246018 A | 9/2004 |
| JP | 2004-253892 A | 9/2004 |
| JP | 2004-295015 A | 10/2004 |
| JP | 2006-078564 A | 3/2006 |
| JP | 2006-080984 A | 3/2006 |
| JP | 2008-008976 A | 1/2008 |
| JP | 2011-070150 A | 4/2011 |

OTHER PUBLICATIONS

"Comparative study of spectral reflectance estimation based on broad-band imaging systems", Society of Photo-Optical Instrumentation Engineers, Imai et al., 2008 (Year: 2008).*
Oct. 15, 2013 International Search Report in International Patent Appln. No. PCT/JP2013/005134.
Mar. 8, 2016 European Search Report in European Patent Appln. No. 13833020.4.
Michael Schaub, et al., "Molded Optics Design and Manufacture", Series in Optics and Optoelectronics, Taylor & Francis Group, LLC, 2011, Section 3.4.1.13, p. 88.
Oct. 23, 2017 Japanese Decision to Grant a Patent in Japanese Patent Appln. No. 2014-532804.
Mar. 27, 2017 Japanese Official Action Notification of Reasons for Refusal in Japanese Patent Appln. No. 2014-532804.

* cited by examiner

LIGHT AMOUNT ADJUSTING DEVICE, IMAGING OPTICAL SYSTEM, AND IMAGE CAPTURING APPARATUS

This application is a continuation of application Ser. No. 14/627,091 filed Feb. 20, 2015, which is a continuation of International Patent Application No. PCT/JP2013/005134 filed on Aug. 30, 2013, and claims priority to Japanese Patent Application No. 2012-192229 filed on Aug. 31, 2012, the entire content of both of which is incorporated herein by reference.

TECHNICAL FIELD

The present invention relates to a light amount adjusting device, an imaging optical system, and an image capturing apparatus.

BACKGROUND ART

The imaging system of a digital camera, a video camera, or the like conventionally includes an image sensor and a mechanism that adjusts the amount of light incident on the image sensor. An example of the mechanism that adjusts the light amount is a stop device. The stop device drives diaphragm blades and adjusts the opening diameter in accordance with the luminance of an object, thereby adjusting the amount of light incident on the image sensor. When the luminance of the object is high, the opening diameter needs to be small. However, when the opening has a predetermined diameter or less, image quality may degrade due to a hunting phenomenon or diffraction of light. A recent image sensor has a high sensitivity, and the demand for further light amount suppression is growing.

For this purpose, a light attenuation filter having an almost even transmittance within the wavelength range of visible light (400 to 700 nm), for example, an ND (Neutral Density) filter is used. More specifically, when the ND filter is arranged near the diaphragm blades, the amount of light incident on the image sensor can be attenuated while maintaining the opening diameter. There are, for example, an ND filter made by mass-coloring glass or plastic with a pigment or dye and an ND filter formed by stacking a plurality of inorganic films on a substrate by vacuum deposition, sputtering, or the like. Considering the optical characteristic and the environmental characteristic, the latter ND filter is generally used in the imaging optical system.

There has been developed a technology of providing a plurality of ND filters in the imaging optical system and switching the ND filter to be inserted into the optical path in accordance with the luminance of an object (Japanese Patent Laid-Open No. 2001-222042). Also developed is a technology of providing regions of different light transmittances in one ND filter and switching the region to be inserted into the optical path in accordance with the luminance of an object (Japanese Patent Laid-Open No. 2004-295015).

SUMMARY OF INVENTION

According to an embodiment of the invention, a light amount adjusting device comprises a plurality of optical filter elements having different light transmittances, wherein reflected light colors from the plurality of optical filter elements are substantially equal.

According to another embodiment of the invention, a light amount adjusting device comprises at least three ND filter elements having different light transmittances, wherein all of reflected light colors from each of the at least three ND filter elements are substantially equal.

According to still another embodiment of the invention, an imaging optical system comprises a light amount adjusting device, wherein the light amount adjusting device comprises a plurality of optical filter elements having different light transmittances, and reflected light colors from the plurality of optical filter elements are substantially equal.

According to yet another embodiment of the invention, an image capturing apparatus comprises an imaging optical system, wherein the imaging optical system a light amount adjusting device, the light amount adjusting device comprises a plurality of optical filter elements having different light transmittances, and reflected light colors from the plurality of optical filter elements are substantially equal.

According to yet still another embodiment of the invention, an imaging optical system comprises a light amount adjusting device, wherein the light amount adjusting device comprises at least three ND filter elements having different light transmittances, and all of reflected light colors from each of the at least three ND filter elements are substantially equal.

According to still yet another embodiment of the invention, an image capturing apparatus comprises an imaging optical system, wherein the imaging optical system a light amount adjusting device, the light amount adjusting device comprises a plurality of optical filter elements having different light transmittances, and reflected light colors from the plurality of optical filter elements are substantially equal.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

When a light attenuation filter is used in the imaging optical system, a ghost is readily formed. Especially when switching the light attenuation filter, the formed ghost gives a large sense of discomfort to the photographer.

Some embodiments of the present invention enable reduction of a sense of discomfort that a ghost gives to a photographer when switching an optical filter in accordance with the luminance of an object.

The present inventors found that a sense of discomfort that a photographer feels due to a ghost is reduced by substantially equalizing the reflected light colors of light attenuation filters and achieved the present invention.

The embodiments of the present invention will now be described with reference to the accompanying drawings. However, the scope of the present invention is not limited to the following embodiments.

First Embodiment

Figure 1:
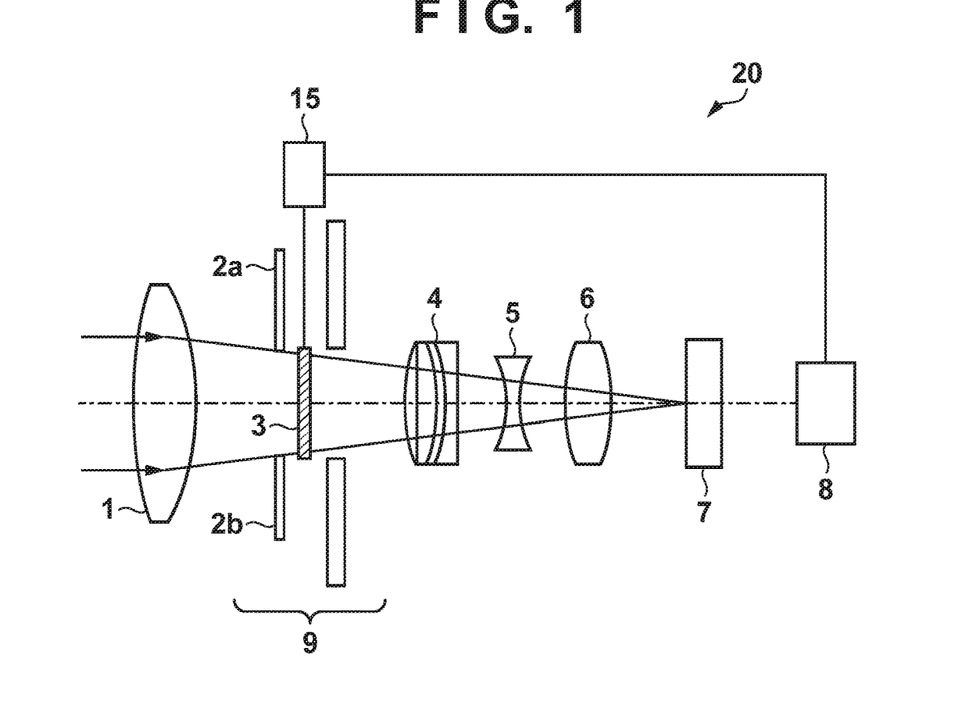
FIG. 1 is a view showing an imaging optical system according to an embodiment of the present invention.

FIG. 1 illustrates an imaging optical system 20 according to an embodiment of the present invention. The imaging optical system 20 includes lenses 1 and 4 to 6, a light amount adjusting device 9, and an image sensor 7. Incident light passes through the lenses 1 and 4 to 6 and the light amount adjusting device 9 and enters the image sensor 7. The image sensor 7 converts the incident light into an electrical signal representing an image.

The light amount adjusting device 9 includes a plurality of optical filter elements having different light transmittances. The amount of light incident on the image sensor 7 can be adjusted by switching the optical filter element inserted in the optical path.

The optical filter element is a member that adjusts light transmission. The plurality of optical filter elements may be held on a single substrate and constructed as one optical filter. The plurality of optical filter elements may be constructed as separate members. In this embodiment, the light amount adjusting device includes an optical filter in which one or more optical filter elements are arranged. For example, the light amount adjusting device 9 may include a plurality of optical filters, and the plurality of optical filter elements may be arranged on the separate optical filters, respectively.

Alternatively, the light amount adjusting device may include one optical filter, and the plurality of optical filter elements may be arranged on the one optical filter. In this embodiment, a plurality of optical filter elements 10a to 13a are arranged on separate optical filters 10 to 13, respectively.

In this embodiment, the light amount adjusting device 9 includes the four optical filter elements 10a to 13a. However, the number of optical filter elements provided in the light amount adjusting device 9 is not limited to this, and two or more optical filter elements suffice. The optical filter elements 10a to 13a have optical densities that are different from each other. That is, the optical filter elements 10a to 13a have different light transmittances. Such an optical filter element can be a light attenuation filter such as an ND filter. For example, the light amount adjusting device 9 may include three or more ND filter elements having different light transmittances. The reflected light colors of the plurality of optical filter elements, that is, the optical filter elements 10a to 13a substantially equal. In the present invention, "reflected light colors substantially equal" preferably means, for example, that the reflected light colors of the plurality of optical filters equal within the range of a region where colors are regarded as even and identified as colors of the same system under various identification conditions and also within the range of color differences of marking pens, as shown in Table 2 to be described later. More preferably, the reflected light colors equal within the range where colors are regarded as almost the same by time-course comparison. More preferably, the reflected light colors equal within the range where colors are determined to be within the tolerance in consideration of various kinds of error factors. More preferably, the reflected light colors equal within the indistinguishable range where color differences cannot be discriminated by measurements.

The light amount adjusting device 9 further includes a driving unit 15 (moving means) capable of inserting and retracting each optical filter element into and from the optical path, that is, arranging and removing each optical filter element in and from the optical path. In FIG. 1, an optical filter 3 that is one of the four optical filters is inserted in the optical path. The light amount adjusting device 9 changes the optical filter arranged in the optical path, that is, changes the optical filter element arranged in the optical path using the driving unit 15, thereby controlling the amount of light incident on the image sensor 7. The optical filter to be arranged in the optical path can be decided in consideration of the amount of light incident on the image sensor 7, the diameter of diaphragm blades 2a and 2b, and the like.

For example, the imaging optical system 20 may include a light amount control unit 8 or may be communicably connected to the light amount control unit 8. The light amount control unit 8 decides the optical filter to be arranged in the optical path so as to optimize the amount of light incident on the image sensor 7 based on light amount information obtained from the image sensor 7, the position information of the diaphragm blades 2a and 2b, and the like. Based on this decision, the light amount adjusting device 9 can change the optical filter arranged in the optical path.

The light amount adjusting device 9 may further include the diaphragm blades 2a and 2b. The diaphragm blades 2a and 2b form the opening of the optical path of the imaging optical system 20. The diaphragm blades 2a and 2b can be arranged in consideration of the amount of light incident on the image sensor 7, the diameter of the diaphragm blades 2a and 2b, and the like. For example, the light amount control unit 8 may acquire the position information of the diaphragm blades 2a and 2b. The light amount control unit 8 may drive the diaphragm blades 2a and 2b so as to obtain an optimum opening based on the light amount information obtained from the image sensor 7, the position information of the diaphragm blades 2a and 2b, and the like.

Figure 2:
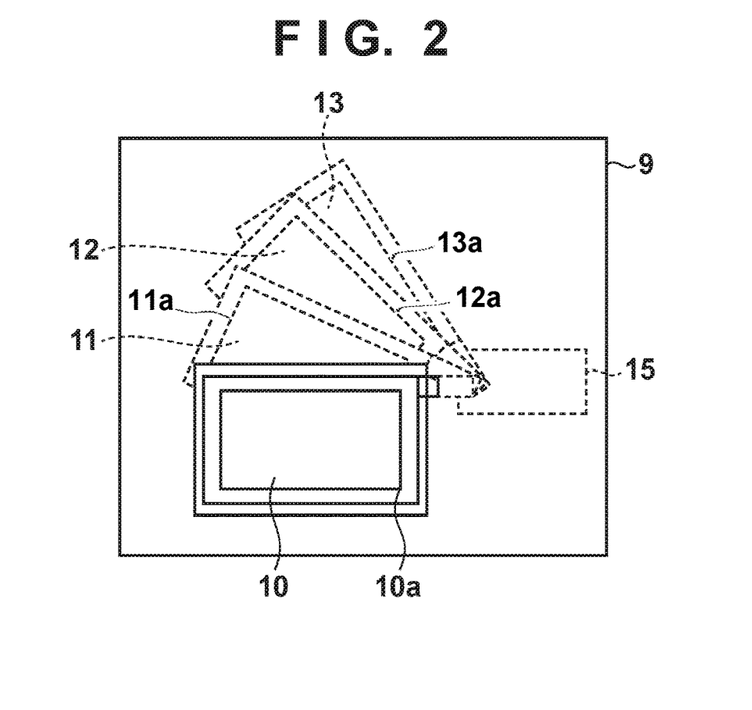
FIG. 2 is a view showing a light amount adjusting device according to an embodiment of the present invention.

The light amount adjusting device 9 will be described below in more detail with reference to FIG. 2. In the light amount adjusting device 9 shown in FIG. 2, the plurality of optical filters 10 to 13 can independently enter/retreat in/from the optical path. As shown in FIG. 2, the driving unit 15 can switch the position of each of the optical filters 10 to 13 between the position on the optical path and that outside the optical path. As described above, each of the optical filters 10 to 13 includes an optical filter element (for example, optical filter element 10a) to be inserted into the optical path to cover the opening.

Figure 6:
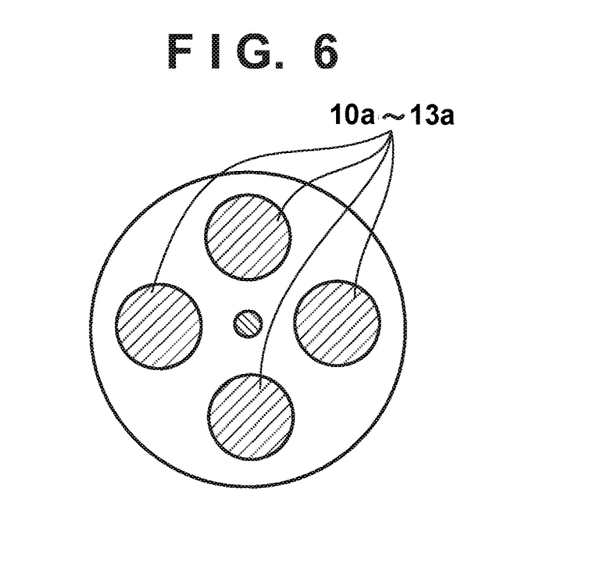
FIG. 6 is a view showing a light amount adjusting device according to an embodiment of the present invention.

Another embodiment of the light amount adjusting device 9 will be described with reference to FIG. 6. In the light amount adjusting device 9 shown in FIG. 6, the plurality of optical filter elements 10a to 13a are arranged like a turret. More specifically, the plurality of optical filter elements 10a to 13a are circularly arranged on a disc. When the driving unit 15 rotates the disc, a desired optical filter element is inserted into the optical path. To reduce the sense of discomfort of the photographer upon switching the optical filter element, the optical filter elements are preferably arranged on the disc in the order of the magnitude of transmittance.

In this embodiment, the optical filter elements 10a to 13a provided in the light amount adjusting device 9 have different light transmittances. The reflected light colors of the optical filter elements 10a to 13a substantially equal. When the light amount adjusting device 9 includes the optical filter elements 10a to 13a of such a combination, the sense of discomfort that a ghost gives to the photographer can be reduced even upon switching the optical filter element.

More specifically, it was found that when the reflected light colors of the optical filter elements 10a to 13a substantially equal, the color of a ghost hardly changes upon switching the optical filter element. It is believed that this reduces the sense of discomfort given to the photographer.

The present inventors estimate as follows the reason why the color of a ghost hardly changes even upon switching the optical filter element when the optical filter elements 10a to 13a of the above combination are used. That is, the ghost is assumed to be formed by light reflection near the image sensor. For example, a ghost can be formed when light that has passed through the optical filter element and the lenses once is reflected near the image sensor and reflected by the optical filter element and the lenses again and then enters the image sensor. In particular, since the optical filter element has a high reflectance as compared to the lenses and the like and readily causes a ghost, it is considered that the correlation between the color of the ghost and the reflected light colors of the optical filter elements 10a to 13a becomes large.

For this reason, the reflected light colors on the image sensor-side surfaces of the optical filter elements 10a to 13a on the image sensor side probably especially affect the color of the ghost. From this viewpoint, the reflected light colors on the image sensor-side surfaces of the optical filter elements 10a to 13a preferably substantially equal. However, the reflected light colors on the object-side surfaces of the optical filter elements 10a to 13a are also considered to affect the color of the ghost. This is because a ghost can be formed even when, for example, light reflected by the object-side surface of one of the optical filter elements 10a to 13a and further reflected by the lens 1 enters the image sensor 7. From this viewpoint, the reflected light colors on the object-side surfaces of the optical filter elements 10a to 13a also preferably substantially equal. More preferably, the reflected light colors on the image sensor-side surfaces of the optical filter elements 10a to 13a substantially equal, and additionally, the reflected light colors on the object-side surfaces of the optical filter elements 10a to 13a substantially equal.

Out of the plurality of optical filter elements, two optical filter elements having transmittances close to each other preferably have substantially equal reflected light colors. Here, "two optical filter elements having transmittances close to each other" indicate two (a set of) optical filter elements that are located adjacent to each other when the plurality of optical filter elements are arranged in the order of the magnitude of transmittance. In this embodiment, the transmittances of the optical filter elements 10a to 13a are assumed to have a relationship represented by optical filter element 10a>optical filter element 11a>optical filter element 12a>optical filter element 13a. In this case, "two optical filter elements having transmittances close to each other" indicate the set of the optical filter elements 10a and 11a, the set of the optical filter elements 11a and 12a, or the set of the optical filter elements 12a and 13a. The reflected light colors preferably substantially equal for at least one of the sets of optical filter elements. In this case, it is possible to reduce the sense of discomfort that the ghost gives to the photographer when performing switching between the two optical filter elements having transmittances close to each other. More preferably, the reflected light colors substantially equal for all of the sets of optical filter elements.

As another detailed example, the reflected light colors preferably substantially equal for all of the plurality of optical filter elements.

The expression "reflected light colors substantially equal" will be explained below. The reflected light color means the surface color of an optical filter element when light strikes its surface. A case where a human can visually determine reflected light colors as equal is also included in "reflected light colors substantially equal". If a human cannot visually distinguish reflected light colors, the reflected light colors can be identified as substantially equal or the same. Hence, this case is also included in "reflected light colors substantially equal". Note that the reflected light color can be observed using, for example, $D_{65}$ as the light source by setting the incident angle to 5° and the reflection angle to 5°.

The reflected light colors can be considered as substantially equal when the color difference between the reflected light colors is 10 or less, more preferably, 5 or less, more preferably, 0.6 or less, and particularly preferably, 0.2 or less. That is, for the optical filter elements 10a to 13a, preferably, the reflected light colors substantially equal, and the color difference between the reflected light colors is 10 or less, more preferably, 5 or less. More specifically, for the optical filter elements 10a to 13a, the color difference between the reflected light colors on the image sensor-side surfaces is preferably 10 or less, more preferably, 5 or less. In addition, the color difference in the reflected light colors is preferably 10 or less, more preferably, 5 or less between two optical filter elements having transmittances close to each other. Furthermore, the color difference in the reflected light colors is preferably 10 or less, more preferably, 5 or less between all optical filter elements. When such a condition is satisfied, it is possible to reduce the sense of discomfort that the ghost gives to the photographer when switching the optical filter element. Here, the color difference is calculated from a CIE 2000 color difference formula to be described later. $D_{65}$ is used as the light source, and an incident angle of 5° and a sensitivity in a 10-degree visual field are used.

More specifically, the color difference in the reflected light colors on the image sensor-side surfaces is preferably 10 or less between all optical filter elements, and the color difference in the reflected light colors on the image sensor-side surfaces is preferably 5 or less between two optical filter elements having transmittances close to each other. This arrangement can reduce the sense of discomfort given to the photographer even when sequentially switching optical filters having transmittances close to each other.

In this embodiment, the color difference between the reflected light colors indicates, for example, a color difference obtained in accordance with the CIE 2000 color difference formula. The color difference can also be calculated using a CIE L*a*b* color difference formula represented by equation (1) below. However, to more accurately evaluate the color difference that a human can visually perceive, the CIE 2000 color difference formula represented by equation (2) below, which considers the human visual sensitivity better, is preferably used. The color difference between the reflected light colors of the optical filter elements based on the CIE 2000 color difference formula can be said to be almost on the same level as a color difference based on human vision.

[Mathematical 1]

$$\Delta E^*_{ab} = [(\Delta L^*)^2 + (\Delta a^*)^2 + (\Delta b^*)^2]^{1/2} \quad (1)$$

[Mathematical 2]

$$\Delta E^*_{00} = [(\Delta L^*/(K_L \cdot S_L))^2 + (\Delta C^*_{ab}/(K_C \cdot S_C))^2 + (\Delta H^*_{ab}/(K_H \cdot S_H))^2 + (R_T(\Delta C^*_{ab}/(K_C \cdot S_C)) \cdot (\Delta H^*_{ab}/(K_H \cdot S_H)))]^{1/2} \quad (2)$$

where
$\Delta L^*$, $\Delta C^*$, $\Delta H^*$: color difference values with respect to a reference color in the L*a*b* color system
$K_L$, $K_C$, $K_H$: parametric coefficients
$S_L$, $S_C$, $S_H$: weighting coefficients
$R_T$: rotation function The parametric coefficients $K_L$, $K_C$, and $K_H$ represent a brightness coefficient, a chroma coefficient, and a hue coefficient, respectively, which are constants arbitrarily set by test conditions.

The weighting coefficients $S_L$, $S_C$, and $S_H$ are given by

[Mathematical 3]

$$S_L = 1 + 0.015(L^*-50)^2/(20+(L^*-50)^2)^{1/2} \quad (3)$$

$$S_C = 1 + 0.045 \overline{C}^*_{ab} \quad (4)$$

$$S_H = 1 + 0.015 \overline{C}^*_{ab} \overline{L}^* \quad (5)$$

The rotation coefficient $R_T$ is given by

[Mathematical 4]

$$R_T = -\sin(2\Delta\theta) R_C \quad (6)$$

$\Delta\theta$ and $R_C$ are given by

[Mathematical 5]

$$\Delta\theta = 30 \exp\{-[(h_{ob}-275)/25]^2\}$$

$$R_C = 2[(\overline{C}^*_{ab})^7/((\overline{C}^*_{ab})^7 + 25^7)]^{1/2}$$

where h: metric color difference of a reference sample

The color of a ghost that occurs in the imaging optical system is probably affected by the sensitivity of the image sensor. However, the sensitivity of the image sensor to visible light is relatively close to the sensitivity of a human eye. For this reason, the color difference between the reflected light colors calculated by the CIE 2000 color difference formula represents a change in the tint of the ghost upon switching the optical filter element well.

Figure 3:
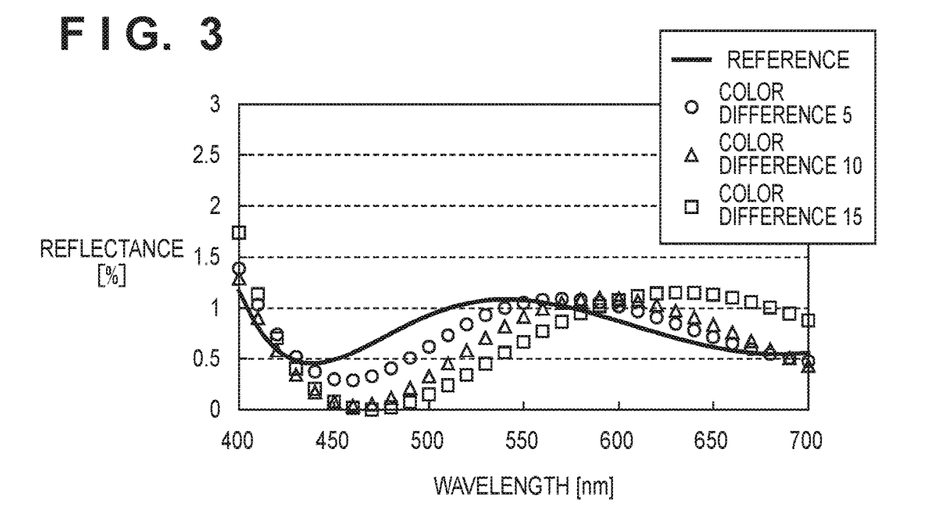
FIG. 3 is a graph showing the reflection spectra of optical filters used in an experimental example.
Figure 4:
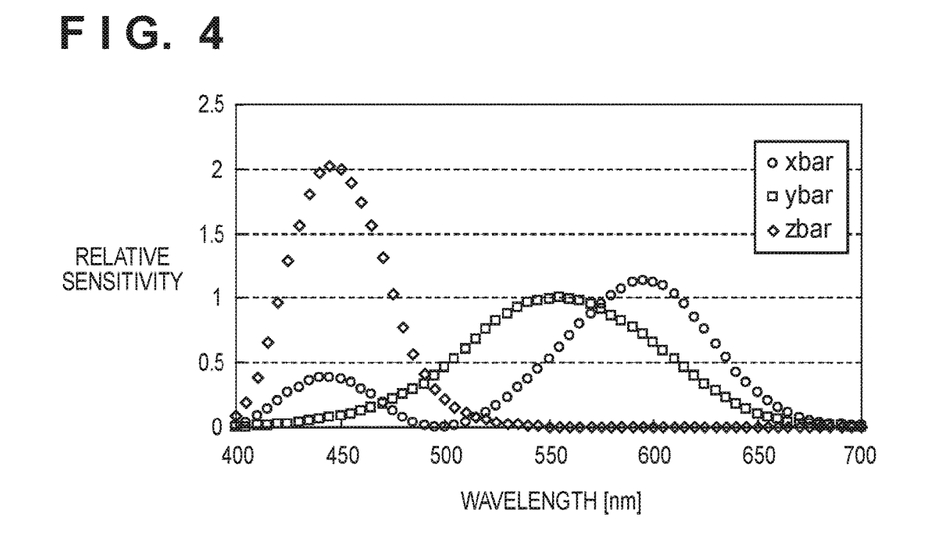
FIG. 4 is a graph showing human visual sensitivities.
Figure 5A:
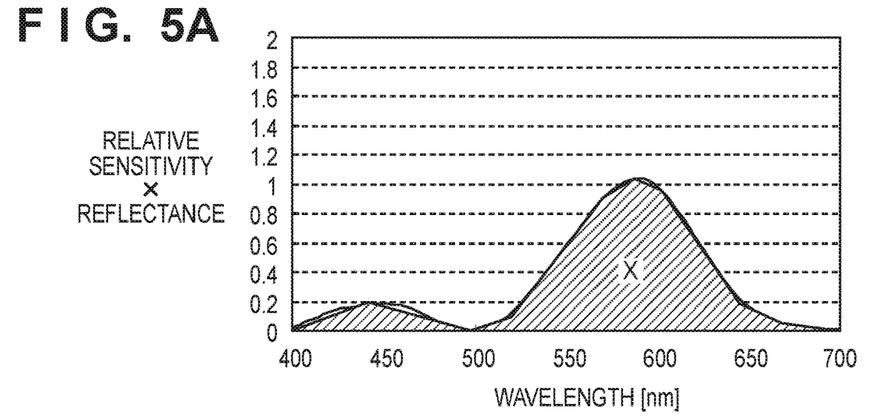
FIG. 5A is a graph obtained by multiplying a reflection characteristic by a human visual sensitivity.
Figure 5B:
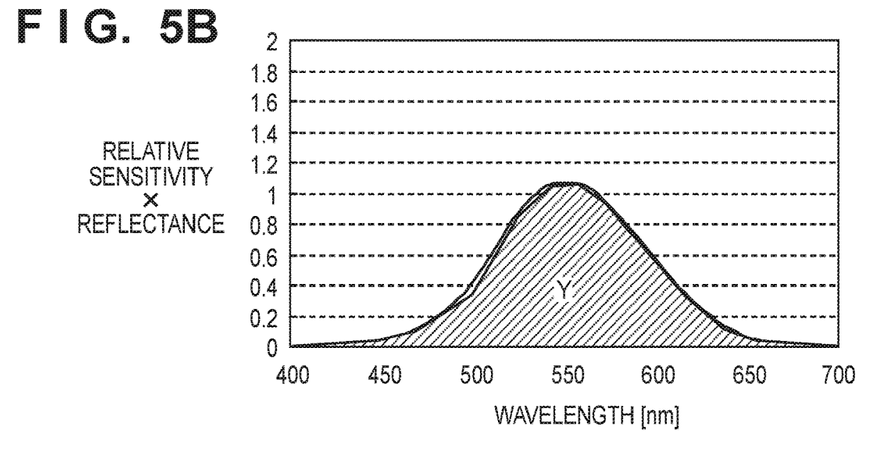
FIG. 5B is a graph obtained by multiplying a reflection characteristic by a human visual sensitivity.
Figure 5C:
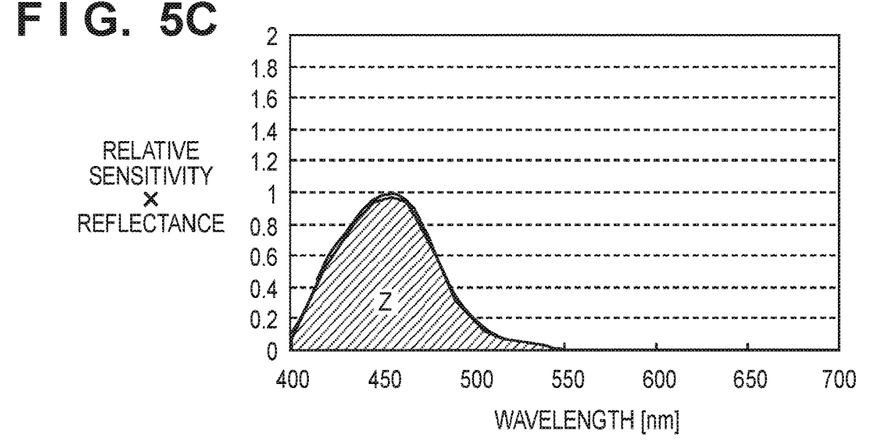
FIG. 5C is a graph obtained by multiplying a reflection characteristic by a human visual sensitivity.

A human can recognize a color because of a sensation corresponding to the primary colors of light, that is, "red", "green", and "blue". A human eye has different sensitivities to "red", "green", and "blue". FIG. 4 is a graph showing human eye sensitivities to "red", "green", and "blue". In the graph, "xbar", "ybar", and "zbar" are the sensitivities to "red", "green", and "blue", respectively. A color that a human visually recognizes from light having a predetermined reflection spectrum is determined in accordance with an area ratio obtained by multiplying the reflection spectrum by "xbar", "ybar", and "zbar". For example, FIG. 5A is a graph obtained by multiplying a reflection spectrum indicated as "reference" in FIG. 3 by "xbar". FIG. 5B is a graph obtained by multiplying the reflection spectrum by "ybar". FIG. 5C is a graph obtained by multiplying the reflection spectrum by "zbar".

The color visually recognized by a human is determined by the areas of regions "X", "Y", and "Z" indicated by hatching in FIGS. 5A to 5C. That is, when the areas of the regions "X", "Y", and "Z" measured for the reflection spectra of the optical filter elements substantially equal, the reflected light colors of the optical filter elements substantially equal. For this reason, even when the optical filter element is switched, the change in the tint of the ghost is small, and the sense of discomfort given to the photographer can be reduced. The graphs in FIG. 4 correspond to color matching functions defined by CIE, and the areas of "X", "Y", and "Z" correspond to tristimulus values. The reflection spectrum represents the reflectance of an optical filter element on a wavelength basis. Here, the reflection spectrum is measured at an incident angle to 5° and a reflection angle to 5°.

As described above, the areas of "X", "Y", and "Z" obtained in the above-described manner preferably substantially equal between the plurality of optical filter elements. More specifically, $$\Delta Y \leq 25 \quad (7)$$

$$\{("X"/"Y")\max/("X"/"Y")\min\} \leq 2 \quad (8)$$

$$\{("Z"/"Y")\max/("Z"/"Y")\min\} \leq 5 \quad (9)$$

are preferably satisfied.

In equations (7) to (9), $\Delta Y$ is the difference between the maximum value of "Y" and the minimum value or "Y" for all optical filter elements mounted in the light amount adjusting device. ("X"/"Y")max and ("X"/"Y")min are the maximum value of ("X"/"Y") and the minimum value of ("X"/"Y") for all optical filter elements mounted in the light amount adjusting device. ("Z"/"Y")max and ("Z"/"Y")min are the maximum value of ("Z"/"Y") and the minimum value of ("Z"/"Y") for all optical filter elements mounted in the light amount adjusting device.

In addition, the areas of "X", "Y", and "Z" preferably substantially equal between two optical filter elements having transmittances close to each other out of the optical filter elements mounted in the light amount adjusting device. More specifically, $$\Delta Y \leq 12.5 \quad (10)$$

$$\{("X"/"Y")\max/("X"/"Y")\min\} \leq 1.5 \quad (11)$$

$$\{("Z"/"Y")\max/("Z"/"Y")\min\} \leq 2.5 \quad (12)$$

are preferably satisfied.

In equations (10) to (12), $\Delta Y$ is the difference between a larger "Y" and a smaller "Y" for the two optical filter elements. ("X"/"Y")max and ("X"/"Y")min are a larger ("X"/"Y") and a smaller ("X"/"Y") for the two optical filter elements. ("Z"/"Y")max and ("Z"/"Y")min are a larger ("Z"/"Y") and a smaller ("Z"/"Y") for the two optical filter elements.

Furthermore, the reflectances preferably substantially equal between the plurality of optical filter elements. The magnitude of the reflectance of an optical filter element is considered to affect the intensity of a ghost. Hence, in this case, the intensity of a formed ghost rarely changes between the plurality of optical filter elements. Since the intensity of the ghost rarely changes even when the optical filter element is switched, the sense of discomfort given to the photographer can further be reduced.

More preferably, the reflection spectra substantially equal between the plurality of optical filter elements. That the reflection spectra substantially equal between the plurality of optical filter elements means that the reflectances substantially equal between the plurality of optical filter elements for light of various wavelengths. Hence, the sense of discomfort given to the photographer can further be reduced under various shooting conditions. When the reflected light colors are substantially equalized between the plurality of optical filter elements, and the reflection spectrums are substantially equalized between the plurality of optical filter elements, as described above, the sense of discomfort given to the photographer can be reduced more efficiently. For example, the maximum reflectance difference is preferably 1.0% or less, more preferably, 0.5% or less between the optical filter element having the highest maximum reflectance and that having the lowest maximum reflectance out of the optical filter elements mounted in the light amount adjusting device. The maximum reflectance is a reflectance at a wavelength of the highest reflectance within a light wavelength range of 400 to 700 nm.

Experimental Example

Experiments were conducted to examine the influence of the color difference in the reflected light colors between optical filter elements on a photographer. More specifically, four optical filters were prepared. The optical filters respectively include optical filter elements having equal light transmittances. The reflection spectrum of the first optical filter is indicated by "reference" in FIG. 3. The reflection spectra of the second to fourth optical filters are indicated by "color difference 5", "color difference 10", and "color difference 15" in FIG. 3, respectively. The color differences between the reflected light color of the first optical filter and the reflected light colors of the second, third, and fourth optical filters, which are calculated by the CIE 2000 color difference formula, are 5, 10, and 15, respectively. To calculate the color differences, $D_{65}$ was used as the light source, the incident angle was set to 5°, a sensitivity in a 10-degree visual field was used, and all the parametric coefficients $K_L$, $K_C$, and $K_H$ were set to 1. The above reflection spectra and reflected light colors were measured on the image sensor-side surfaces of the optical filters.

The first optical filter and the second to fourth optical filters were incorporated in a single light amount adjusting device. That is, the light amount adjusting device includes four optical filter elements. The light amount adjusting device was incorporated in an imaging optical system. An image captured by an image sensor provided in the imaging optical system was presented to the photographer via a display unit. It was visually evaluated whether a color change of a ghost was perceived upon changing the optical filter inserted in the optical path from the first optical filter to each of the second to fourth optical filters. Table 1 shows the result. "Color difference 5" shows the result obtained upon changing from the first optical filter to the second optical filter, "color difference 10" shows the result obtained upon changing from the first optical filter to the third optical filter, and "color difference 15" shows the result obtained upon changing from the first optical filter to the fourth optical filter. Note that in the optical filters of "color difference 5", "color difference 10", and "color difference 15" shown in Table 1, the color differences were 4.3, 9.0, and 14.8 in a 2-degree visual field.

TABLE 1

| | Color difference | | |
|---|---|---|---|
| | 5 | 10 | 15 |
| Evaluation | ◎ | ○ | X |

In Table 1, ◎ represents that there was no sense of discomfort as all, and switching of the optical filter was unnoticed. ○ represents that there was almost no sense of discomfort, and the tint did not so largely change although switching of the optical filter was noticed. x represents that there was a sense of discomfort, and the change in the tint upon switching the optical filter was clearly observed.

As shown in Table 1, when the color difference in the reflected light colors between the optical filters was 15 or more, the color change of the ghost upon switching the optical filter was perceived. On the other hand, when the color difference was 10 or less, the color change of the ghost gave no sense of discomfort to the photographer. When the color difference was 5 or less, the color change of the ghost was not recognized by the photographer.

As is apparent from the experiments, when the color difference between the reflected light colors on the surfaces on the image sensor side is 10 or less and, more particularly, 5 or less between the plurality of optical filters, the sense of discomfort of the photographer is reduced.

Optical filter switching is normally done between optical filters having adjacent transmittances. Hence, when the color difference in the reflected light colors on the image sensor side is decreased to 5 or less between the optical filters having adjacent transmittances, the sense of discomfort given to the photographer can be reduced dramatically.

It can also be considered that the switching of the optical filter is continuously done in a short period, for example, switching from the first filter to the second filter is performed, and switching from the second filter to the third filter is further performed. In this case as well, if the color difference in the reflected light colors is 10 or less between all optical filters, and the color difference in the reflected light colors is 5 or less between optical filters having adjacent transmittances, the photographer cannot recognize the filter switching and can also rarely recognize the change in the tint.

That is, if the reflected light colors of at least three optical filters to be continuously switched substantially equal, no sense of discomfort is given to the photographer. For example, in another embodiment, if the reflected light colors of at least three optical filters to be continuously switched in the order of the magnitude of transmittance substantially equal, and the number of optical filters that enter/retreat in/from the optical path increase from four to five or six or more, the color difference is allowed to some extent between all optical filters.

Table 2 shows classification of allowable color differences (see new version of Handbook of Color Science, 2nd edition, Color Science Association in Japan). As shown in Table 2, two colors having a color difference of 5 or less are recognized as almost the same color by time-course comparison. Ghost tints before and after switching of the optical filter are compared in time course, and the above-described experimental results match the contents of Table 2.

TABLE 2

| Color difference | Grade | Remarks |
|---|---|---|
| To 0.2 | Immeasurable region | |
| To 0.3 | Identifiable color difference | Colorimetry reproduction accuracy of same object |
| To 0.6 | Grade 1 (strict color difference) | Practical tolerance limit when various error factors are taken into consideration. |
| To 1.2 | Grade 2 (practical color difference a) | Most people can easily recognize the color difference if samples are put side by side. Munsel grade AAA. OD colors of Defense Agency. |
| To 2.5 | Grade 3 (practical color difference b) | People can regard colors as almost the same upon determining samples put apart. Munsel grade AA, JIS standard colors. |
| To 5.0 | Grade 4 | People can regard colors as almost the same by time-course comparison. Munsel grade A. |
| To 10.0 | Grade 5 | Marking pens (JIS 6037-1992) |
| To 20.0 | Grade 6 | Management of colors on color name level. General rules of coating films for automobile parts (JIS D 0202 1988) Color difference of Railway crossing equipment (JIS E 3701-1984) Stamp pads (JIS S 6016-1991) Pencils, colored pencils, and leads for mechanical pencils (JIS S 6005-1992) General rules of safety colors (JIS Z 9109-1986) Identification marking for piping systems Aerospace-Pipelines-Identification (JIS W 0601-1990) |

A detailed example of this embodiment will be described below. A case where the light amount is adjusted using at least one ND filter (ND filter element) and at least one AR (Anti-Reflection) filter as a plurality of optical filter elements will be explained below. Here, the reflected light color of the ND filter and the reflected light color of the AR filter substantially equal.

The optical density of the AR filter is almost 0 (the transmittance is almost 100%). More specifically, the light transmittance of the AR filter is preferably 90% or more, and more preferably, 95% or more. If the luminance of the object is high, and the light amount needs to be adjusted, the ND filter is inserted into the optical path. On the other hand, if the light amount need not be adjusted, the ND filter is removed from the optical path. In this case, defocusing may occur before and after removal of the ND filter. Defocusing caused by the presence/absence of the optical filter element is greatly affected by the thick transparent substrate of the filter. Hence, when the ND filter is removed, the AR filter having a similar transparent substrate is inserted instead, thereby reducing defocusing.

The AR filter is a filter having an anti-reflection function. In this example, the AR filter was designed such that the reflected light color of the ND filter and the reflected light color of the AR filter substantially equal. For this reason, the reflectance of the AR filter need not be very low. For example, for a wavelength of 450 to 650 nm that largely affects human color perception, the average reflectance of the AR filter can be 0.3% or more, or 0.5% or more. This can reduce the sense of discomfort of the photographer when switching is performed between the AR filter and the ND filter.

The light amount adjusting device 9 according to this example includes three ND filters and one AR filter as a plurality of optical filter elements. More specifically, the light amount adjusting device 9 includes an AR filter having an optical density of almost 0 (called ND_00) and ND filters respectively having optical densities of 0.5, 1.0, and 1.5 (called ND_05, ND_10, and ND_15, respectively). Letting T be the transmittance of a filter, the optical density (OD) is given by $OD=\text{Log}(1/T)$. The higher the transmittance is, the lower the optical density is.

The optical filter element ND_00 was formed by stacking a plurality of thin films having different refractive indices on a transparent substrate.

In recent years, a plastic substrate is used as a transparent substrate for the purpose of reducing the size and weight of an imaging optical system. Various kinds of materials can be used as the plastic substrate, and a polyester resin, norbornene resin, polyether resin, acrylic resin, styrene resin, and the like are usable. In addition, a PES (polyether sulphone) resin, polysulfone resin, PEN (polyethylene naphthalate) resin, PC (polycarbonate) resin, polyimide resin, and the like are also usable. A glass substrate may be used. In this example, PET (polyethylene terephthalate) was used as the transparent substrate.

When using a plastic substrate, a plastic substrate having a high glass transition temperature Tg, a high elastic modulus in bending, and a low water absorbing property is preferably used in consideration of deformation due to membrane stress or thermal stress upon depositing a dielectric layer or a light absorption layer. The substrate is preferably as thin as possible within a range capable of maintaining rigidity. The thickness is preferably about 20 µm to 200 µm, and more preferably, about 25 µm to 100 µm. In this example, a substrate having a thickness of 50 was used.

The thin films on the transparent substrate of the optical filter element ND_00 can be deposited using, for example, vacuum deposition, sputtering, ion plating, IAD, or the like. In this example, the thin films were deposited using vacuum deposition.

The optical filter elements ND_05, ND_10, and ND_15 can be formed in accordance with a conventionally known method. In this example, each optical filter element was formed by stacking a dielectric film and a light absorption film on a transparent substrate using vacuum deposition. The reflected light colors substantially equal between the three ND filters.

The reflected light color of at least one ND filter and the reflected light color of the AR filter (ND_00) preferably substantially equal because the sense of discomfort of the photographer upon switching the filter can be reduced. In particular, reflected light colors on the image sensor-side surfaces preferably substantially equal. Normally, switching is performed between the AR filter and the ND filter (ND_05) having the lowest optical density. Hence, the reflected light color of the AR filter and the reflected light color of the ND filter (ND_05) having the lowest optical density preferably substantially equal.

When the light amount adjusting device 9 has the arrangement shown in FIG. 2, the AR filter may be arranged between two of the three ND filters or outside the group of the three ND filters. At any rate, the light amount can be adjusted by switching the ND filters and the AR filter. When the light amount adjusting device 9 has the arrangement shown in FIG. 6, the AR filter is preferably arranged to be adjacent to the ND filter (ND_05) having the lowest optical density to reduce the sense of discomfort of the photographer upon switching the filter.

Figure 7:
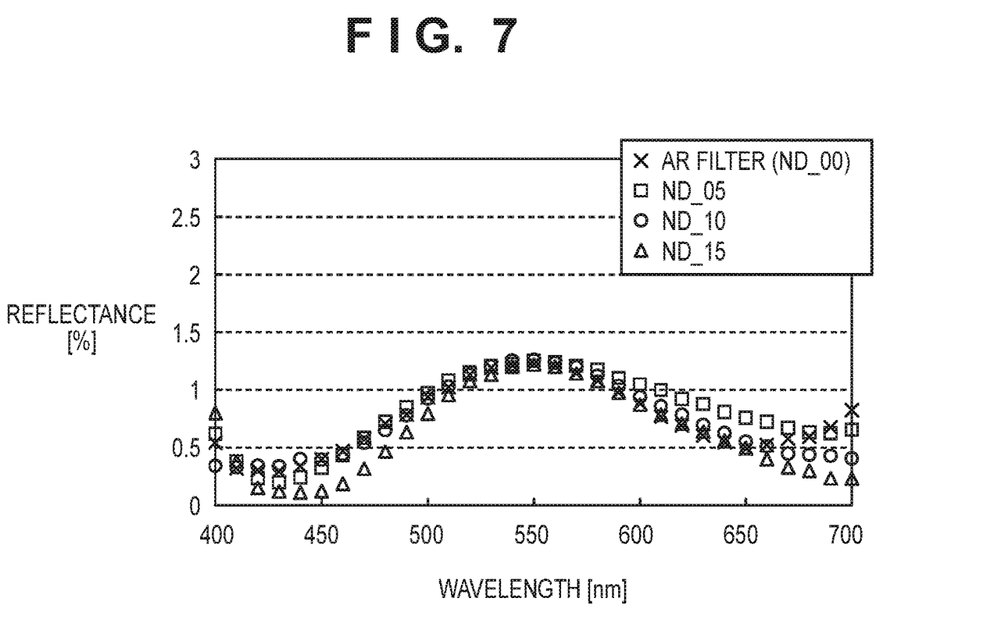
FIG. 7 is a graph showing the reflection characteristic of an optical filter according to an embodiment.

When designing the AR filter, the reflectance is easily designed low as compared to the ND filters because the absorption characteristic of the filter need not be taken into consideration. In this example, however, the AR filter was designed in accordance with the reflection spectra of the remaining three ND filters. FIG. 7 shows the reflection spectra of the optical filter elements provided in the light amount adjusting device 9 of this example.

As for the color difference between optical filters having adjacent transmittances, the color difference in the reflected light colors between the AR filter and ND_05 is 1.992, the color difference in the reflected light colors between ND_05 and ND_10 is 1.242, and the color difference in the reflected light colors between ND_10 and ND_15 is 1.607. The largest color difference in the reflected light colors among the four optical filter elements is the color difference in the reflected light colors between the AR filter and ND_15, that is, 1.998. To calculate the color differences, the CIE 2000 color difference formula was used, $D_{65}$ was used as the light source, the incident angle was set to 5°, and a sensitivity in a 10-degree visual field was used as a condition.

The AR filter has a low light absorbance, and transmittance [%]+reflectance [%]≈100[%]. As shown in FIG. 7, when the reflectance of the AR filter at 500 to 600 nm is raised, the transmittance in this region lowers. However, since the AR filter has a very high transmittance, there is rarely an influence on the color balance even when the transmission characteristic is uneven to some extent.

In this example, the AR filter was formed by stacking thin films having different refractive indices on a transparent substrate, and each ND filter was formed by stacking a dielectric film and a light absorption film on a transparent substrate. The spectral characteristics of these optical filter elements are determined mainly by interference between the thin films or the absorption characteristics of the films. That is, the refractive index and extinction coefficient that are the material characteristics of each thin film, the film thickness of each layer, and the number of layers affect the spectral characteristic of an optical filter element. In this example, each optical filter element having a desired spectral characteristic was formed by appropriately adjusting these factors. The spectral characteristic of an optical filter element using interference between thin films changes depending on the incident angle of light. However, when the light amount adjusting device according to the present invention is used in the imaging optical system, the incident angle is only about 10° to 15°, and the reflected light color rarely changes.

Second Embodiment

A light amount adjusting device 9 according to another embodiment will be described below. In this embodiment, a plurality of optical filter elements are held on a single substrate and constructed as one optical filter. That is, the light amount adjusting device according to this embodiment includes one optical filter, and a plurality of optical filter elements having different light transmittances are arranged in the one optical filter.

Figure 12:
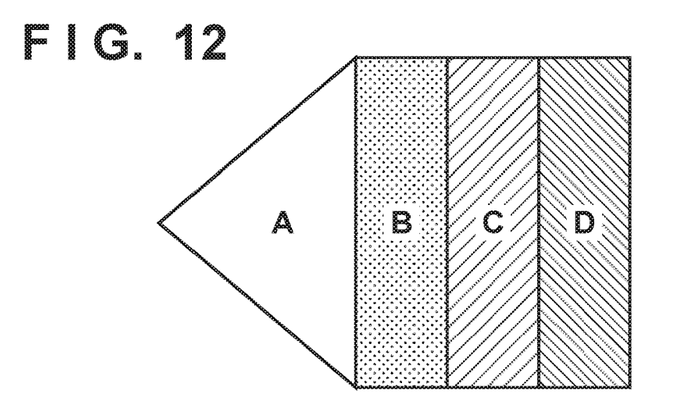
FIG. 12 is a plan view of the optical filter according to an embodiment of the present invention.

FIG. 12 is a plan view of the optical filter according to this embodiment. The optical filter shown in FIG. 12 includes four optical filter elements A to D. The optical filter element A forms an AR region having a function as an AR filter. The optical filter elements B to D from ND regions each having a function as an ND filter. The structure of the optical filter elements A to D is the same as the above-described optical filter elements 10a to 13a. That is, the reflected light colors of the optical filter elements A to D substantially equal. Additionally, the optical filter is designed such that the reflected light colors in the ND regions and the reflected light color in the AR region substantially equal.

The AR region may be arranged between two of the three ND regions or outside the group of the three ND regions. To efficiently switch the optical filter element, the optical filter element A, the optical filter element B, the optical filter element C, and the optical filter element D are preferably arranged in this order, as shown in FIG. 12.

A detailed example of this embodiment will be described below. In this example, the optical density of the optical filter element A (AR region called ND_00) is almost 0, and the optical densities of the optical filter elements B to D (ND regions called ND_05, ND_10, and ND_15, respectively) are 0.5, 1.0, and 1.5, respectively.

Figure 13:
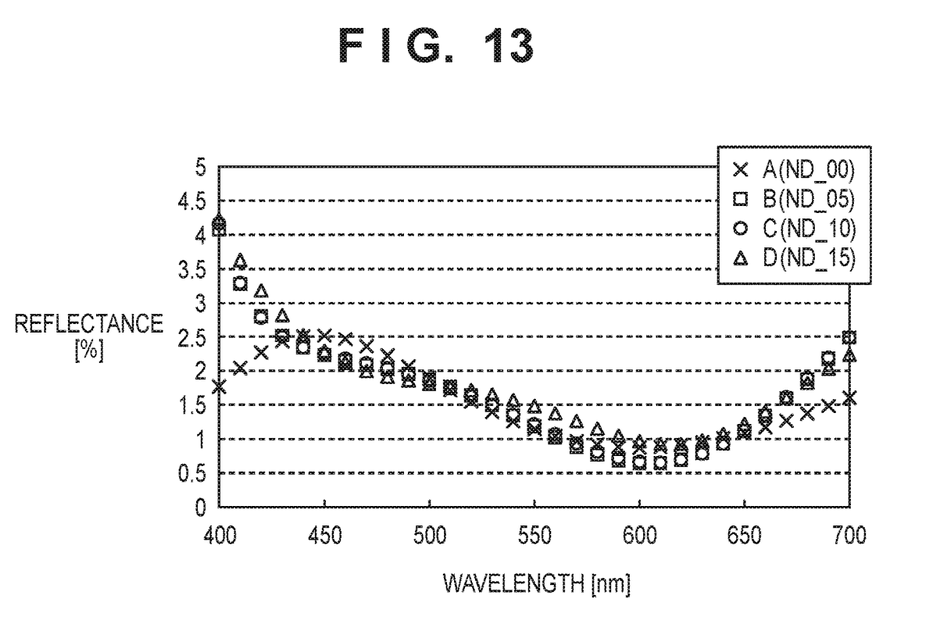
FIG. 13 is a graph showing the reflection characteristic of the optical filter according to an embodiment of the present invention.

FIG. 13 shows the reflection spectra of the optical filter elements according to this example. The color difference in the reflected light colors between ND_00 (A) an ND_05 (B) was 1.949. The color difference in the reflected light colors between ND_05 (B) and ND_10 (C) was 0.196. The color difference in the reflected light colors between ND_10 (C) and ND_15 (D) was 2.171. The largest color difference in the reflected light colors among the four regions was the color difference between ND_05 (B) and ND_15 (D), that is, 2.360. To calculate the color differences, the CIE 2000 color difference formula was used, $D_{65}$ was used as the light source, and a 10-degree visual field was used as a condition.

The optical filter according to this example will further be explained with reference to FIG. 10 that is a sectional view of the optical filter according to this example. The optical filter according to this example has a structure in which films are stacked on a substrate. The substrate includes first to nth regions. First to ith films having first to ith optical densities are stacked on at least one of the obverse surface and the reverse surface of the substrate. Here, n is an integer (n≥2), and i is an integer (1≤i≤n).

Figure 10:
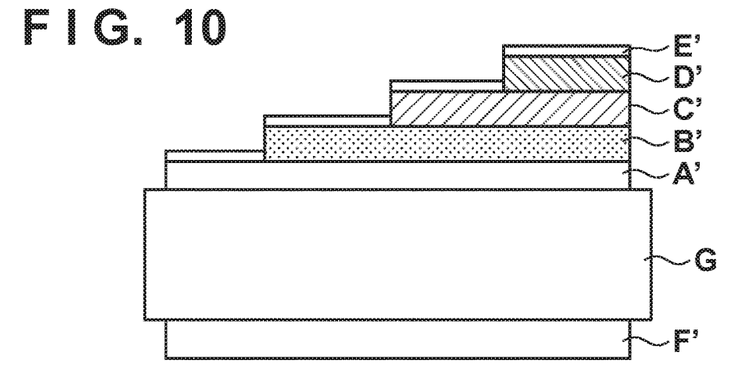
FIG. 10 is a sectional view of the optical filter according to an embodiment of the present invention.

More specifically, the optical filter shown in FIG. 10 has a structure in which first to fourth films A' to D' are stacked on a PET substrate G. The first to fourth films A' to D' have predetermined optical densities, more specifically, first to fourth optical densities. Additional films may be stacked in the optical filter. For example, additional films E' and F' are stacked in the optical filter shown in FIG. 10.

The PET substrate G includes first to fourth regions. In the ith region of the PET substrate G, first to ith films are stacked on at least one of the obverse surface and the reverse surface of the PET substrate G. In the example of FIG. 10, the first region corresponds to the optical filter element A, where the first film A' is stacked. The second region corresponds to the optical filter element B, where the first film A' and the second film B' are stacked. The third region corresponds to the optical filter element C, where the first to third films A' to C' are stacked. The fourth region corresponds to the optical filter element D, where the first to fourth films A' to D' are stacked.

Figure 9:
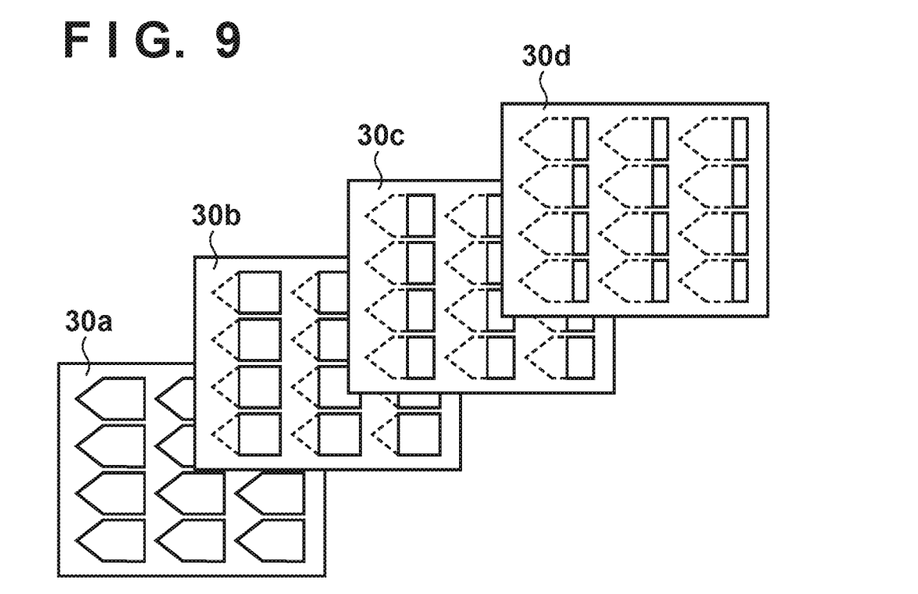
FIG. 9 is a view showing masks used to form an optical filter according to an embodiment of the present invention.

The deposition method of the optical filter according to this example will be described with reference to FIGS. 9 and 10. FIG. 9 shows deposition masks, and FIG. 10 is a sectional view of the optical filter according to this example.

First, a deposition mask 30a having an opening of a shape to deposit on the PET substrate G is set. The deposition mask 30a is attached to a deposition umbrella while setting the surface of the deposition mask 30a facing downward. The deposition umbrella rotates at a predetermined speed at the time of deposition so as not to change the film thickness or substrate temperature depending on the set position. The deposition umbrella is set in the deposition apparatus. When a predetermined temperature and a predetermined degree of vacuum are obtained, a crucible with a deposition material is heated to deposit a film up to a predetermined film thickness. Thin films of a plurality of layers are thus stacked, thereby forming the film A'.

In this example, the optical density of the optical filter element A is almost 0. For this reason, $TiO_2$ and $SiO_2$ that rarely absorb visible light were used as the material of the film A'. As other materials that rarely absorb visible light, for example, $MgF_2$, $Al_2O_3$, MgO, $LaTiO_3$, $ZrO_2$, $Nb_2O_5$, $Ta_2O_5$, and the like are usable.

After the film A', the substrate was unloaded from the deposition apparatus, the deposition mask 30a was exchanged with a deposition mask 30b, and the film B' was formed, like the film A'. The film B' was obtained by stacking a plurality of layers of $SiO_2$ serving as a dielectric film and $TiO_x$ serving as a light absorption film. As another dielectric film material, for example, $MgF_2$, $Al_2O_3$, SiO, MgO, $LaTiO_3$, $ZrO_2$, or the like may be used. As another light absorption film material, a metal or alloy or an oxide or nitride thereof such as Ti, Ni, Cr, NiCr, NiFe, or Nb is usable.

After formation of the film B', the substrate was unloaded from the deposition apparatus again, and the deposition mask 30b was exchanged with a deposition mask 30c. The film C' was formed, like the film B'.

After formation of the film C', the substrate was unloaded from the deposition apparatus again, and the deposition mask 30c was exchanged with a deposition mask 30d. The film D' was formed, like the film C'.

After formation of the film D', the deposition mask 30d was exchanged with the deposition mask 30a again, and $SiO_2$ (E') serving as an anti-reflection film was formed. As the material of the anti-reflection film, a material having a low refractive index is preferable. Alternatively, $MgF_2$ or the like is suitable.

After deposition of the films A' to E', the substrate was turned upside down, and F' serving as an anti-reflection film was formed. The same material as A' was used for F'.

Figure 11:
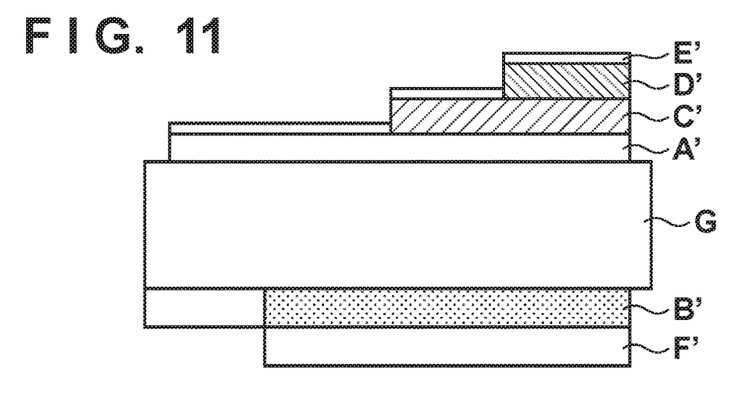
FIG. 11 is a sectional view of the optical filter according to an embodiment of the present invention.

The optical filter according to this embodiment has been described above. However, the structure of the optical filter according to this embodiment is not limited to that shown in FIG. 10. For example, as shown in FIG. 11, films having a light absorption characteristic may be provided on both surfaces of a transparent substrate. The optical filter elements, that is, the regions of ND_00, ND_05, ND_10, and ND_15 in the example may independently be provided on the optical filter. That is, the optical filter according to the embodiment may include a plurality of regions having different light transmittances, and the plurality of regions need only have reflected light colors that substantially equal.

Third Embodiment

An imaging optical system 20 including the above-described light amount adjusting device 9 is usable in an image capturing apparatus. The image capturing apparatus including the imaging optical system 20 can reduce the sense of discomfort given to the photographer upon switching the optical filter in accordance with the luminance of an object. Examples of the image capturing apparatus capable of including the imaging optical system 20 are a video camera and a digital still camera.

Figure 8:
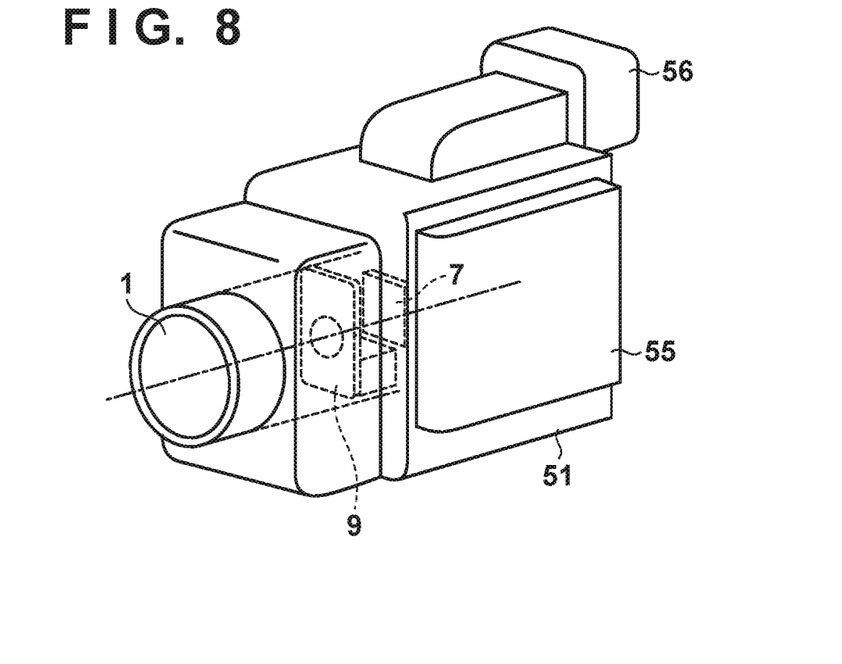
FIG. 8 is a view showing an image capturing apparatus according to an embodiment of the present invention.

FIG. 8 showing the schematic arrangement of a video camera as an example of the image capturing apparatus. A video camera body 51 includes the above-described imaging optical system 20 including a lens 1, a light amount adjusting device 9, and an image sensor 7. A camera control circuit (not shown) determines the light amount based on a photoelectric conversion signal from the image sensor 7, and switches the filter provided in the light amount adjusting device 9 in accordance with the determination result, and adjusts the light amount. A liquid crystal monitor 55 is provided on a side surface of the video camera body 51 so as to be open/closed. A viewfinder 56 is used to observe an object image captured by the image sensor 7.

The present invention is not limited to the above embodiments and various changes and modifications can be made within the spirit and scope of the present invention. Therefore, to apprise the public of the scope of the present invention, the following claims are made.

REFERENCE SIGNS LIST 1, 4-6 . . . lens
2a, 2b . . . diaphragm blade
3 . . . optical filter
7 . . . image sensor
8 . . . light amount control unit
9 . . . light amount adjusting device
10-13 . . . optical filter
15 . . . driving unit
20 . . . imaging optical system
30a-30d . . . mask
51 . . . video camera body
55 . . . liquid crystal monitor
56 . . . viewfinder

The invention claimed is:

1. A light amount adjusting device comprising a filter configured to adjust an amount of light entering an image sensor through the filter, wherein an optical density of a ND filter over a light aperture can be changed such that the amount of light through the light aperture can be changed,
wherein, with respect to reflection spectrum of the ND filter at an image sensor-side, maximum reflectance within a wavelength range from 500 nm to 600 nm is more than maximum reflectance within a wavelength range from 450 nm to 500 nm, and is also more than maximum reflectance within a wavelength range from 600 nm to 650 nm, regardless of the optical density selected.

2. The light amount adjusting device according to claim 1, wherein, with respect to the reflection spectrum of the ND filter at the image sensor-side, maximum reflectance within a visible wavelength range is 2% or less, regardless of the optical density selected.

3. The light amount adjusting device according to claim 1, wherein, with respect to the reflection spectrum of the ND filter at the image sensor-side, a difference of maximum reflectance within a visible wavelength range, between different optical densities, is 1% or less.

4. The light amount adjusting device according to claim 1, wherein, with respect to the reflection spectrum of the ND filter at the image sensor-side, minimum reflectance within the wavelength range from 500 nm to 600 nm is not less than maximum reflectance within a wavelength range from 450 nm to 500 nm and is not less than maximum reflectance within a wavelength range from 600 nm to 650 nm.

5. The light amount adjusting device according to claim 1, wherein spectral characteristic of the ND filter, including reflected light color, is adjusted by stacking a dielectric film and a light absorption film.

6. The light amount adjusting device according to claim 1, wherein the filter comprises three or more of ND filters each having different optical densities.

7. An optical device comprising the light amount adjusting device according to claim 1.

8. A light amount adjusting device comprising a filter configured to adjust an amount of light entering an image sensor through the filter, wherein an optical density of a ND filter over a light aperture can be changed such that the amount of light through the light aperture can be changed,
wherein, with respect to reflection spectrum of the ND filter at an image sensor-side, maximum reflectance within a wavelength range from 450 nm to 500 nm is more than maximum reflectance within a wavelength range from 500 nm to 650 nm.

9. The light amount adjusting device according to claim 8, wherein spectral characteristic of the ND filter, including reflected light color, is adjusted by stacking a dielectric film and a light absorption film.

10. An optical device comprising the light amount adjusting device according to claim 8.

* * * * *